(12) United States Patent
Fukuma et al.

(10) Patent No.: US 7,107,761 B2
(45) Date of Patent: Sep. 19, 2006

(54) EXHAUST CONTROL APPARATUS OF INTERNAL COMBUSTION ENGINE AND EXHAUST GAS FLOW AMOUNT ESTIMATING METHOD

(75) Inventors: Takao Fukuma, Susono (JP); Yoshiyuki Takahashi, Kariya (JP)

(73) Assignees: Toyota Jidosha Kabushiki Kaisha, Tokyo (JP); Kabushiki Kaisha Toyota Jidoshokki, Kariya (JP)

( * ) Notice: Subject to any disclaimer, the term of this patent is extended or adjusted under 35 U.S.C. 154(b) by 85 days.

(21) Appl. No.: 10/892,371

(22) Filed: Jul. 16, 2004

(65) Prior Publication Data

US 2005/0028515 A1 Feb. 10, 2005

(30) Foreign Application Priority Data

Jul. 16, 2003 (JP) ............................. 2003-197589

(51) Int. Cl.
*F01N 3/00* (2006.01)
(52) U.S. Cl. ..................... 60/285; 60/274; 60/278; 60/287; 60/292; 60/324; 123/568.11; 123/568.2; 123/568.21
(58) Field of Classification Search .............. 60/274, 60/278, 280, 285, 286, 287, 288, 291, 292, 60/324; 123/568.11, 568.12, 568.16, 568.19, 123/568.2, 568.21
See application file for complete search history.

(56) References Cited

U.S. PATENT DOCUMENTS

| | | | |
|---|---|---|---|
| 5,562,086 A | * | 10/1996 | Asada et al. ........... 123/568.21 |
| 5,983,876 A | | 11/1999 | Irons et al. |
| 6,014,960 A | * | 1/2000 | Oleksiewicz ............. 123/568.2 |
| 6,122,910 A | * | 9/2000 | Hoshi et al. ................... 60/297 |
| 6,151,890 A | * | 11/2000 | Hoshi ........................... 60/297 |
| 6,422,222 B1 | | 7/2002 | Arbeiter et al. |
| 6,735,937 B1 | * | 5/2004 | Sumilla et al. ............... 60/274 |
| 6,820,597 B1 | * | 11/2004 | Cullen et al. ............... 123/520 |
| 6,917,873 B1 | * | 7/2005 | Itoyama ....................... 701/108 |

FOREIGN PATENT DOCUMENTS

| | | |
|---|---|---|
| DE | 195 00 761 A1 | 7/1996 |
| EP | 0 790 393 A1 | 8/1997 |
| JP | A-03-100314 | 4/1991 |
| JP | A 7-174048 | 7/1995 |
| JP | A 11-117786 | 4/1999 |
| JP | A 6-213044 | 8/2004 |

* cited by examiner

*Primary Examiner*—Binh Q. Tran
(74) *Attorney, Agent, or Firm*—Oliff & Berridge, PLC

(57) ABSTRACT

An exhaust control apparatus applied to an internal combustion engine in which intake sides of a plurality of cylinder groups are connected to a common intake passage and exhaust sides thereof are connected to different exhaust passages, comprises an exhaust gas flow amount adjusting device for causing a flow amount of exhaust gas, which is discharged through each of the exhaust passages of the cylinder groups, to be changed, an exhaust gas flow amount difference estimating device for estimating a difference in an exhaust gas flow amount between the exhaust passages of the cylinder groups, and an exhaust gas flow amount control device for controlling the exhaust gas flow amount adjusting device so as to reduce the estimated difference in the exhaust gas flow amount.

8 Claims, 9 Drawing Sheets

EXHAUST CONTROL APPARATUS OF INTERNAL COMBUSTION ENGINE AND EXHAUST GAS FLOW AMOUNT ESTIMATING METHOD

BACKGROUND OF THE INVENTION

1. Field of the Invention

The present invention relates to an exhaust control apparatus which can cancel an exhaust gas flow amount difference between cylinder groups of an internal combustion engine, and an exhaust gas flow rate estimating method which can be used therefor.

2. Description of the Related Art

As an internal combustion engine having a structure in which cylinder groups are connected to different exhaust passages, there has been, for example, known a V-type engine in which a cylinder group is structured in each of banks and each of the cylinder groups is connected to the different exhaust passage. Further, as an exhaust control apparatus applied to this kind of V-type engine, there has been known an exhaust control apparatus which controls an ignition timing of each bank such that each of catalysts reaches a temperature suitable for reproduction by canceling a dispersion in temperature between the catalysts at the time of reproducing both catalysts in the exhaust passages with respect to a sulfur poisoning (refer to JP 11-117786 A). Further, as the prior art documents in connection with the present invention, JPH06-213044 A and JPH07-174048 A exist additionally.

In the V-type engine as mentioned above, a dispersion is generated in the exhaust gas flow amount introduced to each of the exhaust passages due to a difference in volume charging efficiency between the cylinder groups, a difference in flow amount characteristic of an EGR apparatus and the like, and some kind or another disadvantages maybe generated owing to the matter. For example, since a speed of deterioration of an exhaust purifying catalyst due to the sulfur poisoning or the like correlates with the exhaust gas flow amount, the speed of deterioration is different in the exhaust passage if the exhaust gas flow amount is different in each of the exhaust passages. In this case, an optimum reproduction timing of the exhaust purifying catalyst is displaced between the cylinder groups, there are problems that a reproducing process is executed later than the optimum reproduction timing, whereby a recovery of an exhaust purifying performance is delayed, or the reproducing process is executed earlier than the optimum reproduction timing, whereby unnecessary energy is consumed.

SUMMARY OF THE INVENTION

Accordingly, an object of the present invention is to provide an exhaust control apparatus which can inhibit a dispersion in exhaust gas flow amount between exhaust passages respectively provided in cylinder groups, and an exhaust gas flow amount estimating method which can be used in the apparatus. The term "flow amount" means the volume of the flow per unit time and may be expressed with the term "flow rate".

In order to achieve the object mentioned above, according to the present invention, there is provided an exhaust control apparatus applied to an internal combustion engine in which intake sides of a plurality of cylinder groups are connected to a common intake passage and exhaust sides thereof are connected to different exhaust passages, comprising: an exhaust gas flow amount adjusting device for causing a flow amount of exhaust gas, which is discharged through each of the exhaust passages of the cylinder groups, to be changed; an exhaust gas flow amount difference estimating device for estimating a difference in an exhaust gas flow amount between the exhaust passages of the cylinder groups; and an exhaust gas flow amount control device for controlling the exhaust gas flow amount adjusting device so as to reduce the estimated difference in the exhaust gas flow amount.

According to the exhaust control apparatus, since the flow amount difference of the exhaust gas in each of the exhaust passages is estimated, and the exhaust gas flow amount adjusting device is controlled so as to reduce the difference, it is possible to inhibit the dispersion in the exhaust gas flow amount between the exhaust passages, and it is possible to intend to solve the disadvantages which may be generated in accordance with the dispersion. For example, in the case where each of the exhaust gas flow passages is provided with the exhaust purifying device, it is possible to inhibit the dispersion in the deteriorating speed of the exhaust purifying device, and it is possible to apply the reproducing process simultaneously and in just proportion to the exhaust purifying device in each of the exhaust passages.

In the exhaust control apparatus of the present invention, the estimation of the difference in the exhaust gas flow amount is not limited to quantitatively specifying the difference in the exhaust gas flow amount, but the discrimination of magnitude correlation in the exhaust gas flow amount may be included for the concept thereof as far as it is possible to acquire information required for reducing the difference in the exhaust gas flow amount. Further, the reduction of the difference in the exhaust gas flow amount includes the case that difference in the flow amount is completely canceled as well as the case that the difference is decreased.

The exhaust control apparatus of the present invention can be applied to an internal combustion engine which comprises an intake air amount detecting device for detecting an amount of fresh air to be sucked to the common intake passage. In this case, an exhaust gas flow amount adjusting valve for varying a cross-sectional area through which the exhaust gas is passed may be provided as the exhaust gas flow amount adjusting device, and the exhaust gas flow amount difference estimating device may execute, in turn, an operation of detecting the fresh air amount by the intake air amount detecting device in a state that one exhaust gas flow amount adjusting valve corresponding to one of the cylinder groups is opened at a predetermined degree while the other exhaust gas flow amount adjusting valve corresponding to the other cylinder group is closed, with replacing the exhaust gas flow amount adjusting valve to be opened at the predetermined degree, and estimates the difference in the exhaust gas flow amount by comparing a detection result of the fresh air amount in each detection time.

According to this aspect, since the flow amount of the exhaust gas passing through the exhaust gas flow amount adjusting valve at the time of setting the exhaust gas flow amount adjusting valve to the predetermined opening degree is dispersed between the exhaust gas flow amount adjusting valves owing to their respective flow amount characteristics, the dispersion is generated in the fresh air amount detected at the time of executing the operation mentioned above owing to the flow amount characteristic of the exhaust gas flow amount adjusting valve. Accordingly, it is possible to determine the difference in the flow amount characteristic in each of the exhaust gas flow amount adjusting valves by comparing the detection results of the fresh air amount. Further, since the difference in the flow amount characteristic of each exhaust gas flow amount adjusting valve is one of factors which change the flow amount of the exhaust gas in each of the exhaust passages, it is possible to estimate the difference in the exhaust gas flow amounts of the exhaust passages caused by the difference in the flow amount characteristics of the exhaust gas flow amount adjusting valves by specifying the difference in the flow amount characteristic.

The exhaust control apparatus of the present invention can be applied to an internal combustion engine which comprises an exhaust purifying device arranged in each of the exhaust passages of the cylinder groups, a fuel supplying device for supplying fuel to the exhaust purifying device, and an air fuel ratio detecting device for detecting an air fuel ratio in a downstream side of a fuel supply position by the fuel supplying device. In this case, the exhaust gas flow amount difference estimating device may supply a predetermined amount of the fuel from the fuel supplying device to the exhaust purifying device in each of the exhaust passages, may detect, by the air fuel ratio detecting device, a change in the air fuel ratio before and after supplying the fuel, and may estimate the exhaust gas flow amount in each of the exhaust passages on the basis of the fuel supply amount and detection results of the air fuel ratio.

In the case of supplying the fuel to the exhaust purifying device in the exhaust passage, the air fuel ratio detected in the downstream side of the fuel supply position indicates the change in correspondence to the fuel supply amount and the exhaust gas flow amount at the position. Accordingly, it is possible to estimate the flow amount of the exhaust gas in each of the exhaust passages on the basis of the fuel supply amount and the detected results of the air fuel ratio.

Further, in the case where the flow amount of the exhaust gas is specified by utilizing the air fuel ratio, and where the internal combustion engine is provided with two of cylinder groups and an intake air amount detecting device for detecting an amount of fresh air to be sucked to the common intake passage, the exhaust gas flow amount difference estimating device may comprise: a flow amount ratio information acquiring device for executing a process of determining an exhaust gas flow amount ratio between the exhaust passages on the basis of the estimated exhaust gas flow amount in each of the exhaust passages in connection with a plurality of sampling points set at different positions in an operation area of the internal combustion engine, and acquiring flow amount ratio information describing a correlation between the operation state of the internal combustion engine and the flow amount ratio on the basis of the measured result at each of the sampling points, and an exhaust gas flow amount calculating device for calculating the amount of the exhaust gas discharged from each of the exhaust passages, on the basis of the flow amount ratio conducted from the flow amount ratio information in response to a given operation state, the fresh air amount detected by the intake air amount detecting device, and the amount of the fuel supplied to the cylinder groups.

According to this aspect, as far as the flow amount ratio is determined in connection with the sampling points with respect to the operation area of the internal combustion engine, and the correlation between the operation state and the flow amount ratio is comprehended on the basis of the detected results in advance, it is not necessary to execute the process of supplying the fuel to the exhaust purifying device so as to detect the change in the air fuel ratio every time when the estimation of the exhaust gas flow amount ratio is required. Accordingly, it is possible to estimate the flow amount difference in the exhaust gas in the exhaust passage without changing the operation state of the internal combustion engine, whereby it is possible to adjust the flow amount of the exhaust gas such that the flow amount difference is reduced.

In the exhaust control apparatus of the present invention, the exhaust gas flow amount adjusting device can employ every structure as far as the structure can apply the change to the exhaust gas flow amount in the exhaust passage by an operation control thereof, and is not limited to the apparatus which is provided for the purpose of adjusting the exhaust gas flow amount such as an exhaust gas throttle valve. That is, the exhaust gas flow amount adjusting device may include an apparatus which is provided for the other purpose than the purpose of adjusting the flow amount of the exhaust gas, however, applies an influence to the flow amount of the exhaust gas as a result. Accordingly, the internal combustion engine may be provided with at least one of a turbocharger which can adjust a recovery percentage of exhaust gas energy from each of the exhaust passages of the cylinder groups, an EGR valve which adjusts an amount of the exhaust gas to be returned to the common intake passage from each of the exhaust passages of the cylinder groups, and a variable valve mechanism for changing an operation characteristics of intake valves or exhaust valves with respect to the cylinder groups, as the exhaust gas flow amount adjusting device.

The exhaust control apparatus according to the present invention may be applied to an internal combustion engine which comprises an exhaust purifying device arranged in each of the exhaust passages of the cylinder groups, and a reproduction control device for controlling a reproduction operation of the exhaust purifying device in each exhaust passages in such a manner that the reproduction operation for each exhaust purifying device is executed at the same time. The reproduction operation may include any operation to reproduce the exhaust purifying device. For example, reproduction from surfer poisoning, oxidizing of the PM, reducing the NOx absorbed in the exhaust purifying device and the like.

In order to achieve the object, according another aspect of the present invention, there is provided an exhaust gas flow amount estimating method for estimating a flow amount of exhaust gas in each of exhaust passages, which is applied to an internal combustion engine comprising two cylinder groups which are connected to a common intake passage in each of intake sides and are connected to different exhaust passages in exhaust sides, an intake air amount detecting device for detecting an amount of fresh air sucked into the common intake passage, an exhaust purifying device which is provided in each of the exhaust passages of the cylinder groups, a fuel supplying device for supplying fuel to the exhaust purifying device, and an air fuel ratio detecting device for detecting an air fuel ratio in a downstream side of a fuel supply position by the fuel supplying device, comprising the steps of: executing a measuring process including a procedure of supplying a predetermined amount of fuel to the exhaust purifying device in each of the exhaust passages from the fuel supplying device, detecting a change in the air fuel ratio before and after supplying the fuel by the air fuel ratio detecting device, and estimating a flow amount of the exhaust gas in each of the exhaust passages on the basis of a supply amount of the fuel and a detected result of the air fuel ratio, and a procedure of determining a flow amount ratio of the exhaust gas between the exhaust passages on the basis of the estimated flow amount of the exhaust gas in each of the exhaust passages, said measuring process being executed with respect to a plurality of sampling points set at different positions in an operation area of the internal combustion engine; acquiring flow amount ratio information describing a correlation between the operation state of the internal combustion engine and the flow amount ratio on the basis of the measured result at each of the sampling points; and calculating an amount of the exhaust gas discharged from each of the exhaust passages on the basis of the flow amount ratio conducted to a given operation state from the flow amount ratio information, the fresh air amount detected by the intake air amount detecting device, and the fuel amount supplied to the cylinder groups.

According to the exhaust gas flow amount estimating method, in the case of supplying the fuel to the exhaust purifying device in each exhaust passage, it is possible to estimate the flow amount of the exhaust gas of each exhaust passage by utilizing the change of the air fuel ratio detected by the air fuel ratio detecting device. Further, it is not necessary to execute the procedure of estimating the flow amount of the exhaust gas every time when the estimation of the exhaust gas flow amount of each exhaust passage is required, by determining in advance the flow amount ratio with respect to the sampling points in the operation area of the internal combustion engine, and acquiring the flow amount ratio information describing the operation state and the flow amount ratio on the basis of the detection results. Accordingly, it is possible to estimate the flow amount difference of the exhaust gas in each of the exhaust passages, without changing the operation state of the internal combustion engine.

DESCRIPTION OF THE PREFERRED EMBODIMENTS (First Embodiment)

Figure 1:
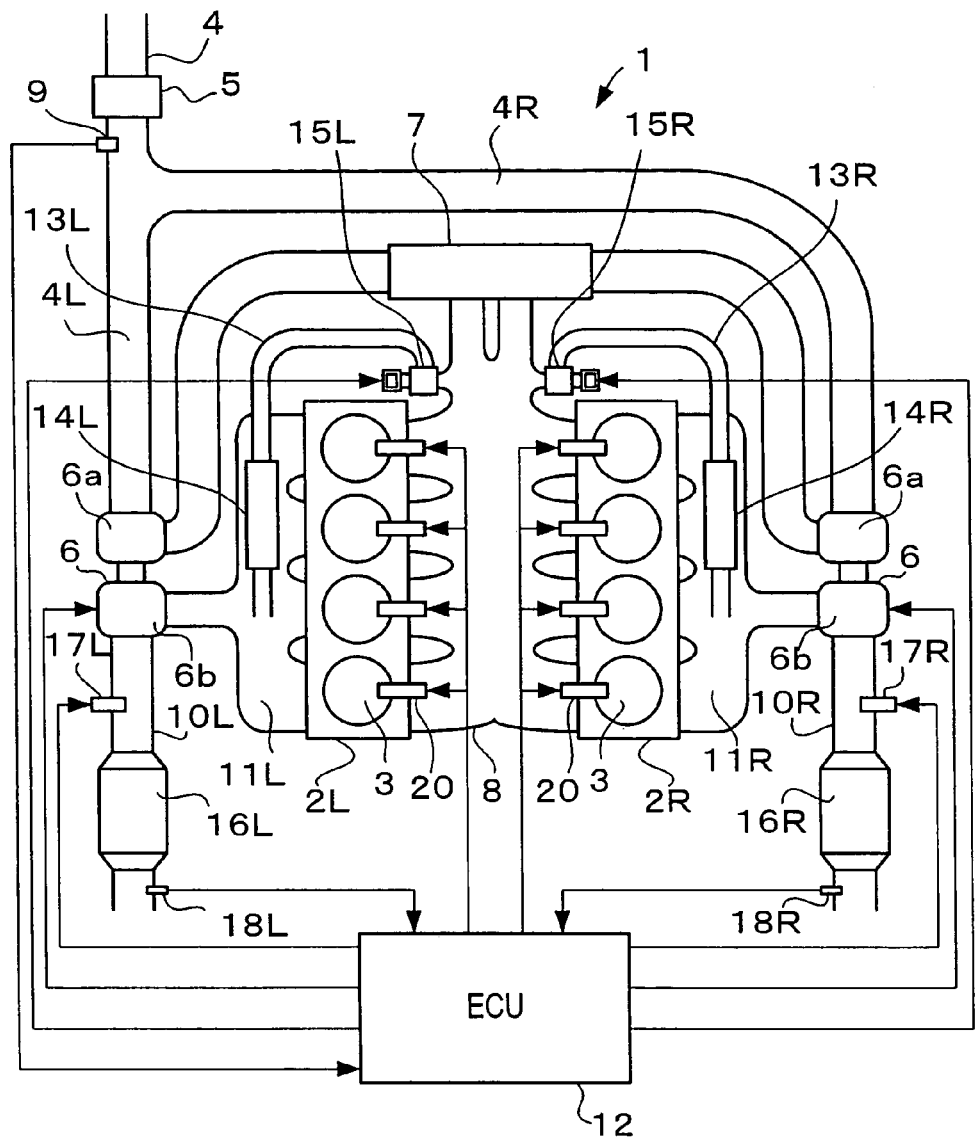
FIG. 1 is a view showing an example of an internal combustion engine to which an exhaust control apparatus of the present invention is applied.

FIG. 1 shows an internal combustion engine for being mounted to a vehicle according to the first embodiment of the present invention. In this embodiment, the internal combustion engine is structured as a V-type 8-cylinder diesel engine 1 in which four cylinders 3 are provided in each of left and right banks 2L and 2R. One cylinder group is structured by the cylinders 3 in the left bank 2L, and another cylinder group is structured by the cylinders 3 in the right bank 2R.

An intake passage 4 for conducting intake air to each of the cylinders 3 is separated into branch passages 4L and 4R per the banks in a downstream side of an air cleaner 5, and a compressor portion 6a of a turbocharger 6 is arranged in each of the branch passages 4L and 4R. Each of the branch passages 4L and 4R passes through an inter cooler 7 in a downstream side of the compressor portion 6a, and is connected to a common intake manifold (a common intake passage) 8 constituting a part of the intake passage 4. An air flow meter 9 is provided in a common portion of the intake passage 4 in an upstream side of the branch passages 4L and 4R of the intake passage 4. The air flow meter 9 serves as an intake air amount detecting device for detecting an amount of fresh air sucked into a whole of the engine 1, in other words, an amount of ambient air taken into the intake passage 4 from an outside of the engine 1. The intake air amount detecting device may be structured such as to measure the other physical quantities such as an intake air pressure and the like correlating with the intake air amount so as to convert into the intake air amount.

On the other hand, the exhaust gas discharged from the cylinder 3 in each of the banks 2L and 2R is conducted to a turbine portion 6b of the turbocharger 6 through each of exhaust manifolds 11L and 11R of exhaust passages 10L and 10R provided for the banks, and is further conducted to a downstream side of the turbine portion 6b. The turbocharger 6 is a variable nozzle turbo charger provided with a nozzle apparatus (not shown) capable of adjusting an opening degree in the turbine portion 6b. The nozzle opening degree of the turbocharger 6 is controlled between a full-open state and a full-close state by an engine control unit (ECU) 12. In the full-close state, the exhaust passages 10L and 10R are closed. The ECU 12 is a well-known computer for controlling an operation state of the engine 1. For example, the ECU 12 controls an injection amount of fuel from a fuel injection valve 20 provided in each of the cylinders 3 in correspondence to an intake air amount detected by the air flow meter 9.

The exhaust manifolds 11L and 11R are connected to the intake manifold 8 via EGR passages 13L and 13R provided for the banks. The EGR passages 13L and 13R provided with EGR coolers 14L and 14R for cooling EGR gas and with EGR valves 15L and 15R for adjusting an EGR flow amount. Opening degrees of the EGR valves 15L and 15R are controlled by the ECU 12 in such a manner that a proper amount of the EGR gas is supplied to the intake manifold 8 in correspondence to the operation of the of the engine 1.

The exhaust passages 10L and 10R in the downstream side of the turbochargers 6 are provided with particular filters (hereinafter, refer also to as a filter in brief) 16L and 16R serving as an exhaust purifying device for collecting particulate matters (PM) in the exhaust gas. The filters 16L and 16R also functions as an NOx occlusion-reduction catalyst by carrying NOx occlusion-reduction materials. Fuel adding valves 17L and 17R, which serve as fuel supplying devices for supplying the fuel to the exhaust passages 10L and 10R, are provided between the turbine portions 6b and the filters 16L and 16R. A fuel addition by each of the fuel adding valves 17L and 17R is executed for a reproducing process (reproduction operation) against a sulfur poisoning of the filters 16L and 16R and a reproducing process thereof by oxidizing the PM under the control of the ECU 12. The ECU 12 controls the reproduction operation, such as the addition of the fuel through the fuel adding valves 17L and 17R, in such a manner that the reproduction operation is executed to both of the filters 16L and 16R at the same time, thereby serving as the reproduction control device of the present invention. Further, air fuel ratio sensors 18L and 18R are provided in a downstream side of the filters 16L and 16R. The air fuel ratio sensors 18L and 18R serve as an air fuel ratio detecting device for detecting an air fuel ratio per the exhaust passages 10L and 10R in a downstream side of a fuel supply position by the fuel adding valves 17L and 17R. A silencer or the like is provided in a downstream side of each of the air fuel ratio sensors 18L and 18R, however, an illustration thereof is omitted. The air fuel ratio detecting device may employ various sensors which can be utilized for detecting the air fuel ratio, such as an oxygen concentration sensor or the like.

In the internal combustion engine 1 mentioned above, since the intake manifold 8 is common to each of the banks 2L and 2R, an equal amount of intake air (including the fresh air and the EGR gas) is expected to be introduced to the cylinders 3 in each of the banks 2L and 2R. Further, if the opening degrees of the EGR valves 15L and 15R and the nozzle opening degrees of the turbochargers 6 are equal to each other between the banks, an equal amount of exhaust gas to each other is expected to flow into the filters 16L and 16R. However, a difference is actually generated in the exhaust gas flow amount flowing into the filters 16L and 16R in the exhaust passages 10L and 10R due to a difference in volumetric charging efficiency between the cylinders 3, a difference in flow amount characteristic between the EGR valves 15L and 15R or a difference in exhaust energy recovery efficiency between the turbochargers 6.

In the case where the difference in the exhaust gas flow amount mentioned above is generated, a deterioration speed caused by an accumulation of the PM and the sulfur poisoning is different in the filters 16L and 16R, and a displacement is generated in a reproduction timing of each of the filters 16L and 16R. If the reproduction of each of the filters 16L and 16R is individually controlled, such a displacement hardly comes into question, however, if the exhaust gas flow amount difference is left as it is, there are possibilities that the exhaust gas flow amount difference becomes excess at the time of a transient operation, and the exhaust gas more than an allowable limit temporarily flows through one filter 16L or 16R, whereby the exhaust purifying performance is deteriorated, and that the displacement in the deterioration of the filters 16L and 16R is excessively enlarged by a long-time continuous operation, whereby the exhaust purifying performance is deteriorated. Accordingly, this embodiment intends to cancel the exhaust gas flow amount difference between the exhaust passages 10L and 10R by executing the flow amount difference compensating control routine in FIG. 2 by the ECU 12. A description will be given below of a procedure thereof. In this case, a routine in FIG. 2 can be executed at an appropriate timing during the operation of the engine 1. Since the routine is accompanied by the operation of the EGR valves 15L and 15R, it is desirable to select and execute an operation state having a reduced influence applied to an exhaust emission.

Figure 2:
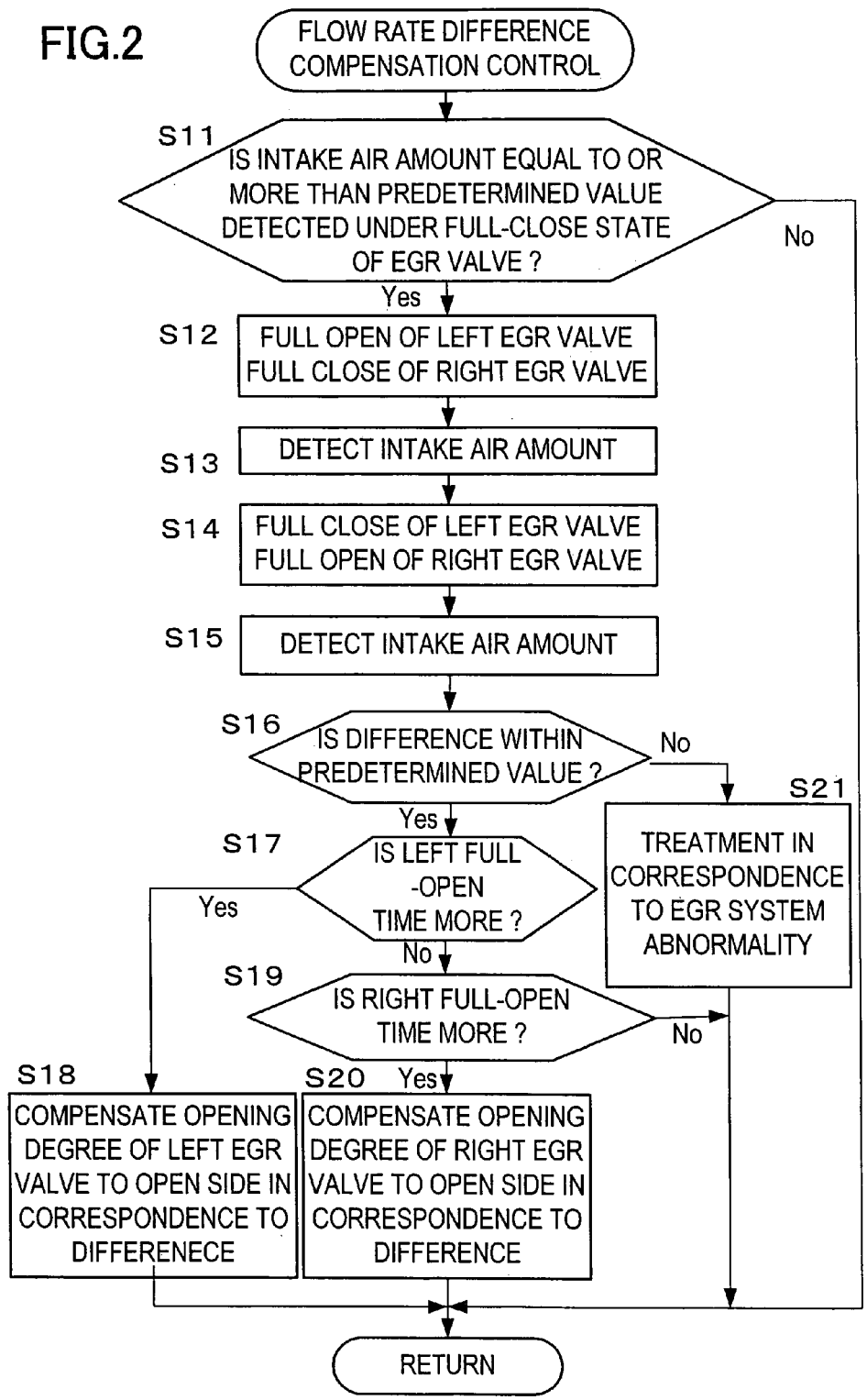
FIG. 2 is a flow chart showing a flow amount difference compensation control routine executed by an ECU in FIG. 1.

In the flow amount difference compensation control routine in FIG. 2, the ECU 12 first operates each of the EGR valves 15L and 15R in a full-close state, that is, a state of shutting off the EGR gas in step S11, and determines whether or not the intake air amount detected by the air flow meter 9 in this state is equal to or more than a predetermined value set as a threshold value required for executing processes in step S12 and the following steps. If the intake air amount is less than the predetermined value, the ECU 12 cancels the process in step S12 and the following steps, and finishes this time routine. On the other hand, if the intake air amount is equal to or more than the predetermined value, the ECU 12 goes to step S12, and sets an opening degree of the EGR valve in the left bank 2L side (hereinafter, refer sometimes to as a left EGR valve) 15L to a full-open, and sets an opening degree of the EGR valve in the right bank 2R side (hereinafter, refer sometimes to as a right EGR valve) 15R to a full-close. In succeeding step S13, the intake air amount is detected by the air flow meter 9. In next step S14, the ECU 12 sets the opening degree of the left EGR valve 15L to the full-close, and sets the opening degree of the right EGR valve 15R to the full-open, respectively, and in succeeding step S15, the intake air amount is detected again by the air flow meter 9.

In next step S16, the ECU 12 determines the difference between the intake air amounts respectively detected in steps S13 and S15 and determines whether or not the difference is within a predetermined value. The predetermined value in this case is a threshold value for determining whether or not any abnormality is generated in the EGR system. If the difference between the intake air amounts is within the predetermined value, the ECU 12 goes to step S17, and determines whether or not the intake air amount detected at the time of the full-open of the left EGR valve 15L is more than the intake air amount detected at the time of the full-open of the right EGR valve 15R. In the case where the ECU 12 determined that it is more, the ECU 12 goes to step S18, and compensates the opening degree of the left EGR valve 15L to the open side in correspondence to the difference between the intake air amounts.

On the other hand, in the case where the condition in step S17 is denied, the ECU 12 goes to step S19, and determines whether or not the intake air amount detected at the time of the full-open of the right EGR valve 15R is more than the intake air amount detected at the time of the full-open of the left EGR valve 15L. In the case where the ECU 12 determines that it is more, the ECU 12 goes to step S20, and compensates the opening degree of the right EGR valve 15R to the open side in correspondence to the difference between the intake air amounts. After compensating the opening degree of the EGR valve 15L or 15R in step S18 or S19, the routine of this time is finished. On the other hand, in the case where the ECU 12 determines in step S16 that the difference between the intake air amounts is enlarged equal to or more than the predetermined value, the ECU 12 assumes that any abnormality is generated in the EGR system, executes in step S21 a predetermined process in correspondence to the abnormality in the EGR system, and thereafter finishes the routine of this time. As the process in step S21, there can be listed up lighting an alarm lamp, execution of protecting operation of the engine 1 and the like.

According to the embodiment mentioned above, the right EGR passage 13R is closed in step S12 in FIG. 2, and the EGR gas is returned to the intake manifold 8 only from the left EGR passage 13L, so that the fresh air taken from the upstream side of the intake passage 4 and the EGR gas returned from the left EGR passage 13L are introduced to the intake manifold 8. Accordingly, the intake air amount detected by the air flow meter 9 in step S13 is reduced with increasing flow amount of the EGR gas introduced from the EGR passage 13L in the full-open state of the EGR valve 15L. On the contrary, in the state in step S14 in FIG. 2, since the fresh air taken from the upstream side of the intake passage 4 and the EGR gas returned from the right EGR passage 13R are introduced to the intake manifold 8, the intake air amount detected by the air flow meter 9 in step S15 is reduced with increasing flow amount of the EGR gas introduced from the EGR passage 13R in the full-open state of the EGR valve 15R.

Figure 3:
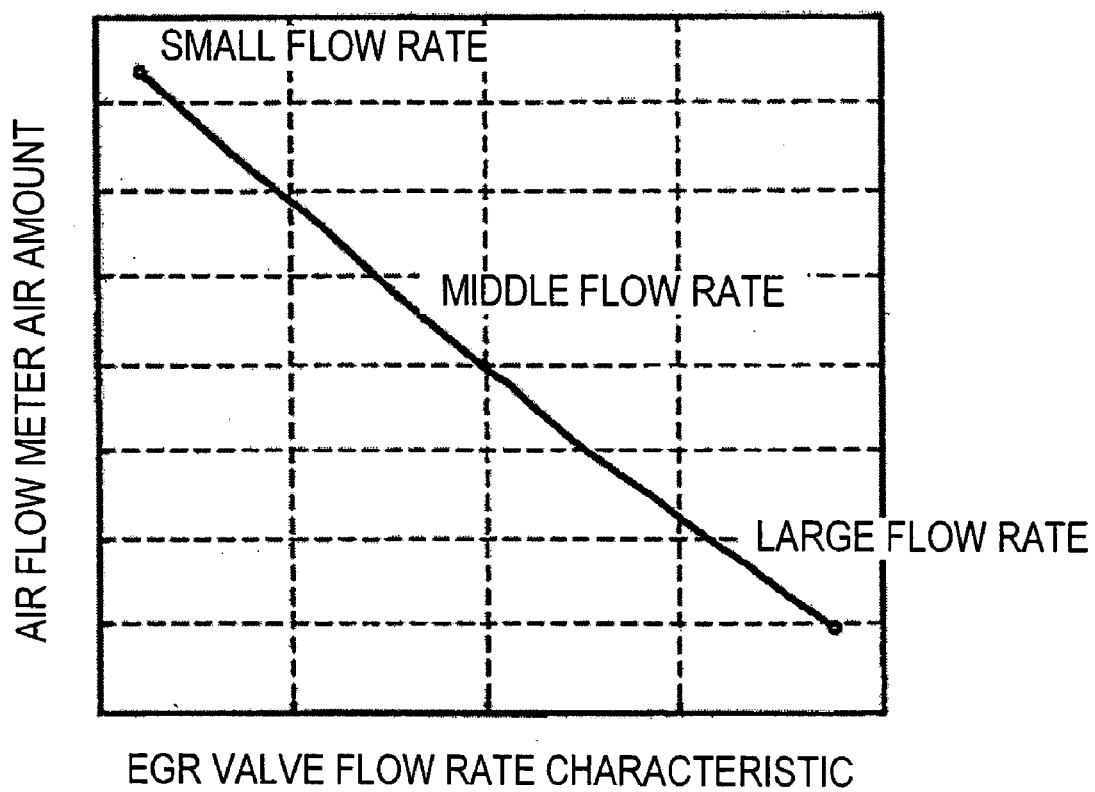
FIG. 3 is a graph showing a correlation between a flow amount characteristic of an EGR valve and an intake air amount detected by an air flow meter.

A correlation exists between the intake air amount detected by the air flow meter 9 in each of step S13 and S15, and the flow amount characteristic of each of the EGR valves 15L and 15R, and the intake air amount (the fresh air amount) detected by the air flow meter 9 is reduced with a deflection to a large flow amount side of the flow amount characteristic of the EGR valves 15L and 15R as shown in FIG. 3, in other words, in accordance with the increase of the flow amount of the EGR gas passing through the EGR valves 15L and 15R under a predetermined opening degree (the full-open state, for example).

Accordingly, in the case where the condition of step S17 in FIG. 2 is affirmed, the left EGR valve 15L tends to throttle the flow amount in comparison with the right EGR valve 15R, and in the case where the condition of step S19 is affirmed, the right EGR valve 15R tends to throttle the flow amount in comparison with the left EGR valve 15L. With respect to the tendency mentioned above, since the opening degree of the left EGR valve 15L is compensated to the open side in step S18, and the opening degree of the right EGR valve 15R is compensated to the open side in step S20, the opening degree of the EGR valve 15L or 15R in the side having the reduced flow amount is increased, and the flow amount difference of the EGR gas returned to the intake manifold 8 from the left and right EGR passages 13L and 13R is reduced, in any case. Further, since the difference between the intake air amounts is increased or decreased in correspondence to the difference in the flow amount characteristic between the EGR valves 15L and 15R, it is possible to cancel the difference in the EGR gas amount returned to the intake manifold 8 from the left and right EGR passages 13L and 13R by changing the compensation amount of the opening degree in step S18 or S20 in correspondence to the difference in the intake air amount.

Further, if the difference in the EGR gas amount caused by the difference in the flow amount characteristic between the EGR valves 15L and 15R is reduced, the flow amount difference of the exhaust gas flowing into each of the left and right filters 16L and 16R is reduced. As a result, it is possible to inhibit the dispersion in the deteriorating speed due to the accumulation of the PM, the sulfur poisoning or the like in the left and right filters 16L and 16R. Further, since the difference in the EGR gas amount of the EGR passages 13L and 13R is reduced, it is possible to inhibit the dispersion in an advance speed of clogging in the EGR coolers 14L and 14R. As is apparent from the above, in steps S16, S17 and S19 in FIG. 2, the ECU 12 indirectly estimates by replacing the difference in the exhaust gas flow amount between the exhaust passages 10L and 10R by the difference in the intake air amount, and the ECU 12 controls the EGR valves 15L and 15R in step S18 or S20 such that the difference in the estimated exhaust gas flow amount is reduced. Accordingly, the ECU 12 functions as the exhaust gas flow amount difference estimating device and the exhaust gas flow amount control device by executing these processes.

In the present embodiment, since the ECU 12 executes the process in response to the abnormality in step S21 in the case where the difference in the intake air amount is excessively enlarged in spite that the routine in FIG. 2 is executed repeatedly, it is possible to prevent the influence applied to the other due to the abnormality of the EGR system from being enlarged. Further, since the difference in the flow amount characteristic of the EGR valves 15L and 15R and the abnormality in the EGR system are detected on the basis of the detected value of the air flow meter 9 used for the fuel injection amount control or the like, it is unnecessary that exclusive sensors are provided for detecting these items, and it is possible to reduce a cost.

(Second Embodiment)

Figure 4:
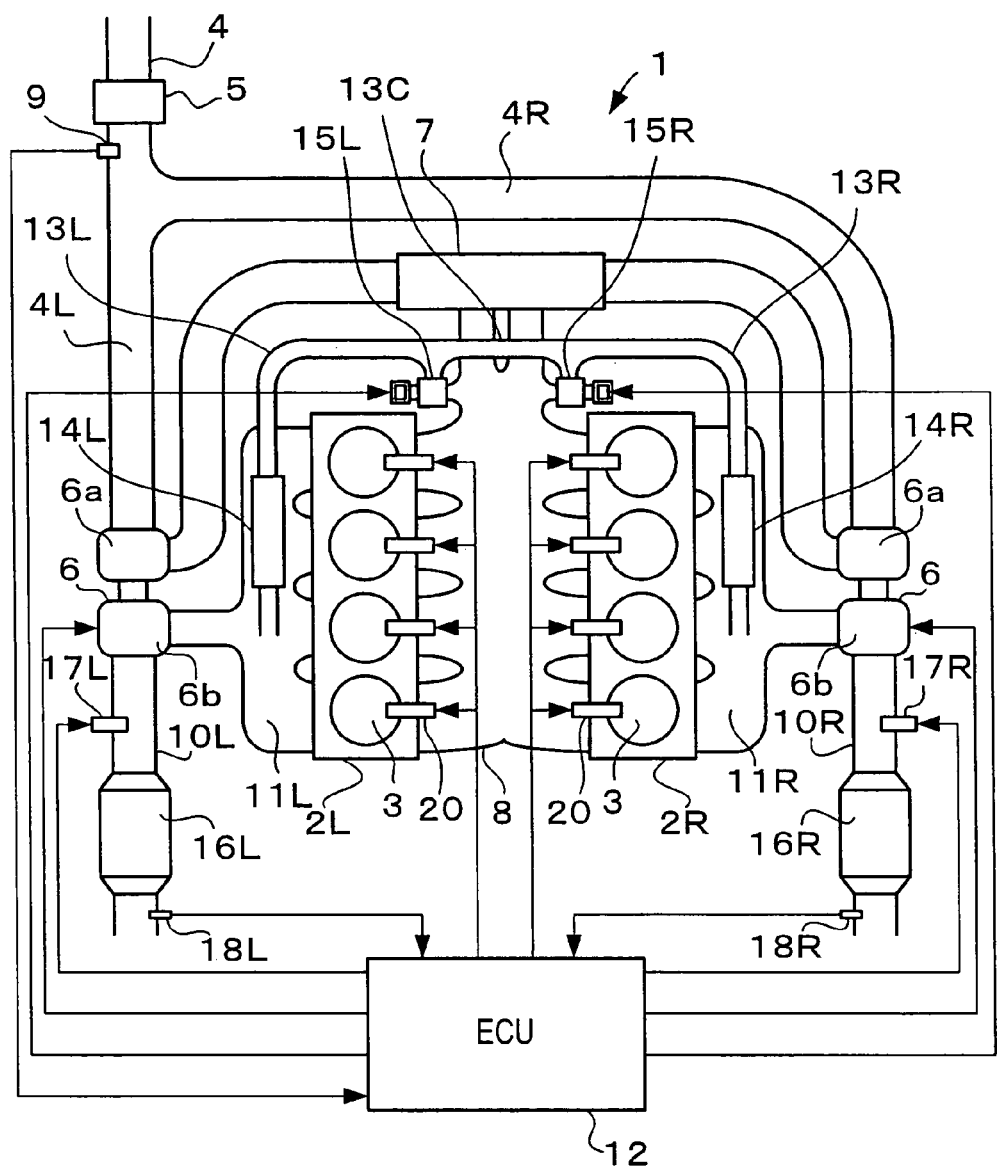
FIG. 4 is a view showing another example of the internal combustion engine to which the exhaust control apparatus of the present invention is applied.
Figure 5:
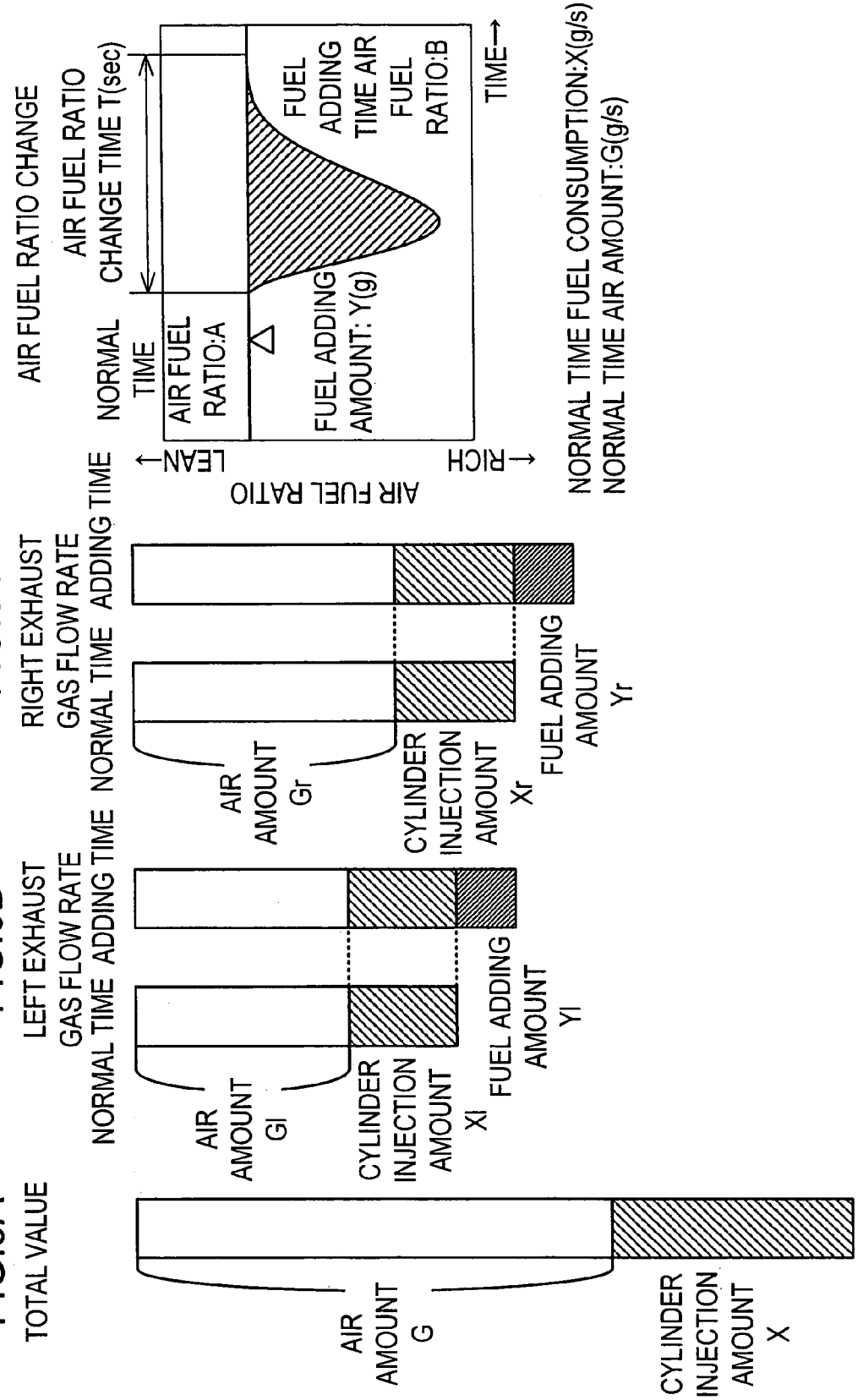
FIGS. 5A to 5D are diagrams for explaining a method of arithmetically operating a flow amount of exhaust gas flowing into a particulate filter.

Next, a description will be given of the second embodiment according to the present invention with reference to FIGS. 4 to 9. FIG. 4 shows an internal combustion engine to which an exhaust control apparatus according to the second embodiment is applied, and the same reference numerals are attached to the same portions as those in FIG. 1. The engine 1 according to this embodiment is different from the engine 1 in FIG. 1 in a point that the left and right EGR passages 13L and 13 Rare connected to each other via a communication passage 13C. The other portions are the same.

The ECU 12 executes a control for reducing the exhaust gas flow amount difference in the filters 16L and 16R of the exhaust passages 10L and 10R in the same manner as that of the first embodiment, however, a procedure thereof is different from the first embodiment. A description will be given below of a calculation of the exhaust gas flow amount difference and an operation for reducing the exhaust gas flow amount difference in the present embodiment.

First, a description will be given of a principle by which the ECU 12 detects the exhaust gas flow amount difference with reference to FIGS. 5A to 5D. First, as shown in FIG. 5A, it is assumed that an intake air amount taken from the intake passage 4 is G, and a total value of a fuel amount (a cylinder injection amount) injected to each of the cylinders 3 from the fuel injection valve 20 is X, in an operation state at the time of detecting the exhaust gas flow amount difference. Further, as shown in FIGS. 5B and 5C as "normal time" respectively, it is assumed that air flow amounts discharged respectively to the exhaust passages 10L and 10R from the left and right banks 2L and 2R are respectively Gl and Gr, and cylinder injection amounts of the fuel with respect to the left and right banks 2L and 2R are respectively Xl and Xr. In this case, units of the intake air amounts G, Gl and Gr, and the cylinder injection amounts X, Xl and Xr are all gram/second (g/s).

In the values mentioned above, the intake air amount G can be detected by the air flow meter 9, and the cylinder injection amounts X, Xl and Xr can be specified respectively as command values from the ECU 12. However, the air amounts Gl and Gr are variously changed owing to the difference in the volumetric charging efficiency with respect to each of the cylinders 3, the difference in the flow amount characteristic of the EGR valves 15L and 15R, the difference in the exhaust energy recovery rate of the turbocharger 6, or the like, and cannot be directly specified.

Accordingly, in this embodiment, as shown in FIGS. 5B and 5C as "adding time", a certain amount Yl and Yr of fuel is added to the exhaust passages 10L and 10R from the fuel adding valves 17L and 17R, and the exhaust gas flow amount difference between the exhaust passages 10L and 10R is acquired by utilizing the change in the air fuel ratio detected by the air fuel ratio sensors 18L and 18R at that time.

For example, as shown in FIGS. 5C and 5D, in the case of adding the predetermined amount Yr of fuel from the fuel adding valve 17R in the right bank 2R, on the assumption that an air fuel ratio detected by the air fuel ratio sensor 18r at a normal time before adding the fuel is set to Ar, an air fuel ratio changing due to the fuel addition is set to Br, a time required for the change is set to Tr, an air amount distributed to the right bank 2R is set to Gr, a cylinder injection amount with respect to the right bank 2R is set to Xr, and an exhaust gas flow amount of the exhaust passage 10R is set to Gexr, the following equations are established. In this case, subscripts l and r for distinguishing left and right from each other are omitted in FIG. 5D.

$$Gr = Xr \cdot Ar$$

$$Gr = (Xr + Yr/Tr) \cdot Br$$

$$Gexr = Gr \cdot (1 + 1/Ar)$$

The exhaust gas flow amount Gexr can be expressed as follows on the basis of these equations.

$$Gexr = Yr \cdot (1 + Ar)/((Ar/Br) - 1) \cdot Tr) \quad (1)$$

Since the air fuel ratio Br at the time of adding the fuel is changed in accordance with the time as shown in FIG. 5D, a denominator in the equation (1) can be given by integration of the time T (from time 0 to Tr), and the equation (1) can be rewritten as the following equation.

$$Gexr = Yr \cdot (1 + Ar)/\int ((Ar/Br) - 1) dT \quad (2)$$

In the equation (2), since the adding amount Yr can be discriminated on the basis of the command value of the ECU 12, and the air fuel ratios Ar and Br can be respectively detected by the air fuel ratio sensor 18R, it is possible to calculate the exhaust gas flow amount Gexr of the right bank 2R on the basis of the values. The exhaust gas flow amount Gexl of the left bank 2L can be determined by replacing the subscript r in the above equations by l in the same manner.

Next, it is possible to determine an exhaust gas flow amount ratio α in accordance with the following equation on the basis of the exhaust gas flow amounts Gexl and Gexr determined by the above equation (2).

$$\alpha = Gexr/Gexl \quad (3)$$

In this case, since the relation G+X=Gexl+Gexr is established, the exhaust gas flow amounts Gexr and Gexl can be rewritten respectively as follows by utilizing the intake air amount G, the cylinder injection amount X and the exhaust gas flow amount difference α.

$$Gexl = (G+X)/(1+\alpha) \quad (4)$$

$$Gexr = (G+X)/(1+(1/\alpha)) \quad (5)$$

Figure 6:
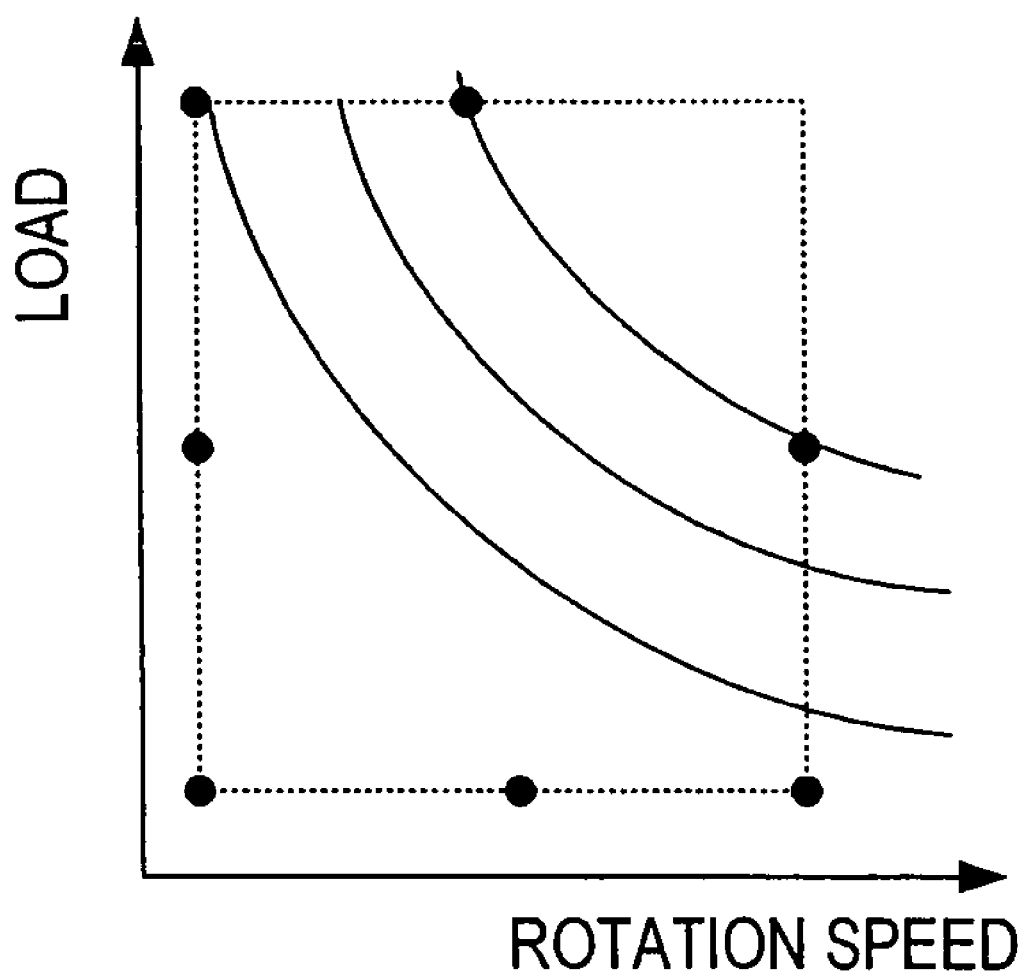
FIG. 6 is a graph showing an example of a sampling point of an operation state which is set as an arithmetic subject of an exhaust gas flow amount difference in a routine in FIG. 7.

As shown in FIG. 6, it is possible to determine the exhaust gas flow amount ratio α in approximately all the areas of the engine 1, by setting some representative points of the operation area used in the engine 1, desirably some points surrounding the operation area as sampling points, acquiring the exhaust gas flow amount ratio a in each of the sampling points in accordance with the above equations (2) and (3), and calculating the exhaust gas flow amount ratio a in each of the operation areas in accordance with the compensation on the basis of the engine rotation speed and the load condition. Further, it is possible to determine the exhaust gas flow amount Gexl and Gexr of each of the banks 2R and 2L, by substituting the determined exhaust gas flow amount ratio α, the intake air amount G and the cylinder injection amount X for the above equations (4) and (5).

Figure 7:
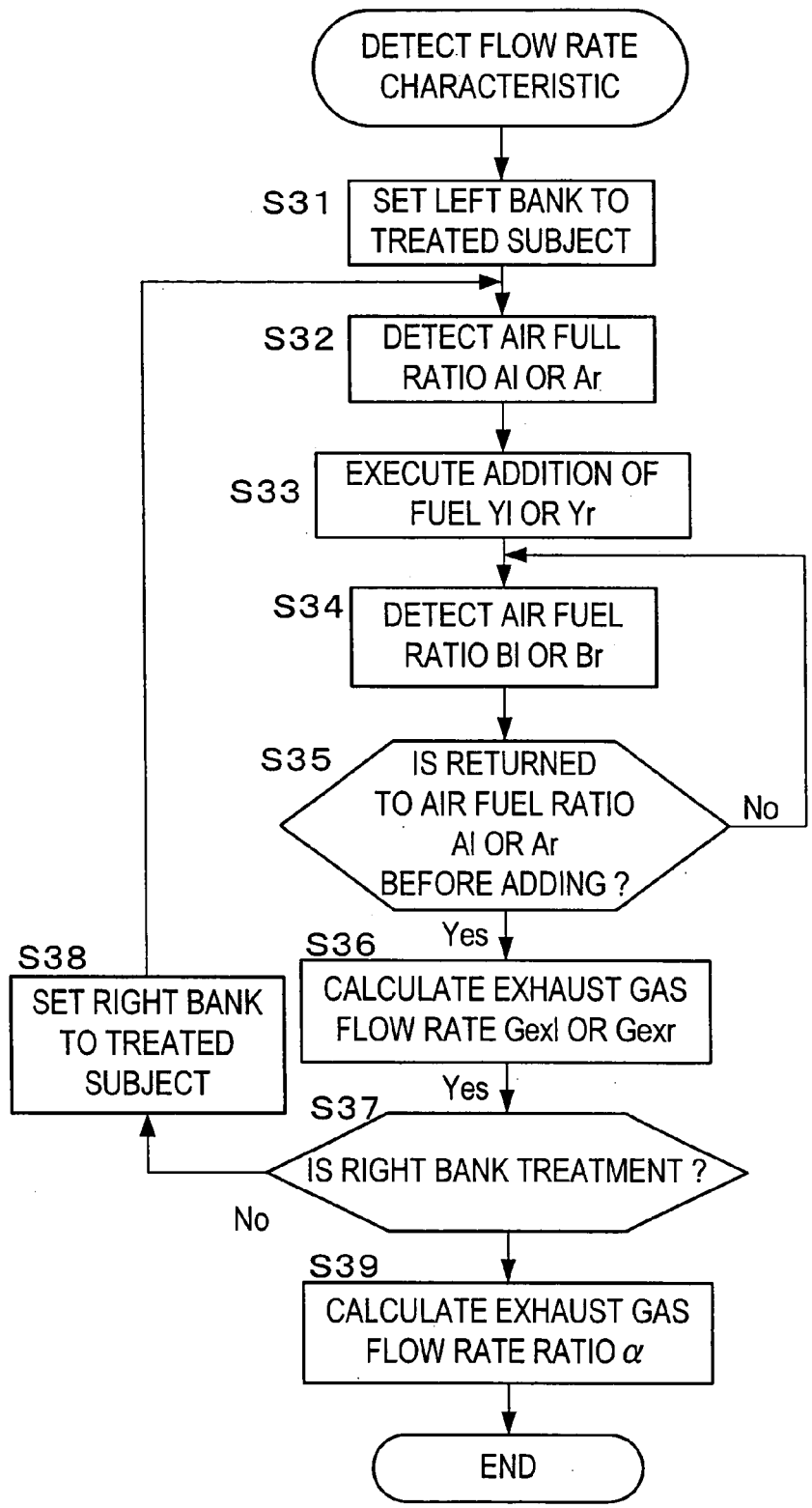
FIG. 7 is a flowchart showing a flow amount characteristic detecting routine executed by the ECU in FIG. 4 for acquiring the exhaust gas flow amount difference.

FIG. 7 shows a flow amount characteristic detecting routine executed by the ECU 12 for determining the exhaust gas flow amount ratio α in the manner mentioned above. This routine may be executed at a time when no trouble is generated in traveling of the vehicle on which the engine 1 is mounted, for example, a shipping time or a maintenance time of the vehicle on which the engine 1 is mounted.

In the flow amount characteristic detecting routine in FIG. 7, the ECU 12 first selects the left bank 2L side as a subject to be treated in step S31, and detects an air fuel ratio (an air fuel ratio before adding the fuel) Al of the exhaust passage 10L corresponding to the bank to be treated (in the case where the left bank is the subject to be treated, and so forth) by the air fuel ratio sensor 18L in succeeding step S32. In succeeding step S33, the ECU 12 executes addition of the fuel amount Yl by the fuel adding valve 17L, and thereafter detects the air fuel ratio Bl after adding the fuel in step S34. In succeeding step S35, the ECU 12 determines whether or not the air fuel ratio Bl after adding the fuel is returned to the air fuel ratio Al which was detected before adding the fuel. If it is not returned, the ECU 12 goes back to step S34 and repeats the detection of the air fuel ratio Bl.

In the case where the ECU 12 determines in step S35 that the air fuel ratio Bl is returned to the air fuel ratio Al, the ECU 12 goes to step S36, and calculates the exhaust gas flow amount Gexl in accordance with the above equation (2). In succeeding step S37, the ECU 12 determines whether or not the calculating process of the exhaust gas flow amount Gexr of the right bank 2R has been executed, and if the process has not been executed, the ECU 12 selects the right bank 2R side as the subject to be treated in step S38 and goes back to step S32. Thereafter, the detection of the air fuel ratio Ar, the addition of the fuel Yr and the detection of the air fuel ratio Br are executed in the same manner as mentioned above, and the exhaust gas flow amount Gexr of the right bank 2R is calculated. When finishing the calculation of the exhaust gas flow amount Gexr about the right bank 2R, the ECU 12 proceeds from step S37 to step S39, and determines that the exhaust gas flow amount ratio α in accordance with the above equation (3) by utilizing the exhaust gas flow amount Gexl and Gexr calculated in step S36. Thereafter, the routine in FIG. 7 is finished. The series of the steps to this corresponds to the measuring process with respect to the flow amount ratio.

The above routine is executed with respect to each of the sampling points shown in FIG. 6. Further, the exhaust gas flow amount ratios α at each of the sampling points is compensated on the basis of the engine rotation speed and the load, whereby the exhaust gas flow amount ratio α can be determined with respect to approximately all the operation areas of the engine 1. The exhaust gas flow amount ratio α determined in the manner mentioned above is stored in a proper memory device, for example, SRAM of the ECU 12 in accordance with a map form in correspondence to the engine speed and the load. The map stored in the manner mentioned above corresponds to the flow amount ratio information describing the correlation between the operation state and the flow amount ratio, and the ECU 12 functions as the flow amount ratio information acquiring device by executing the series of the steps to this step.

Figure 8:
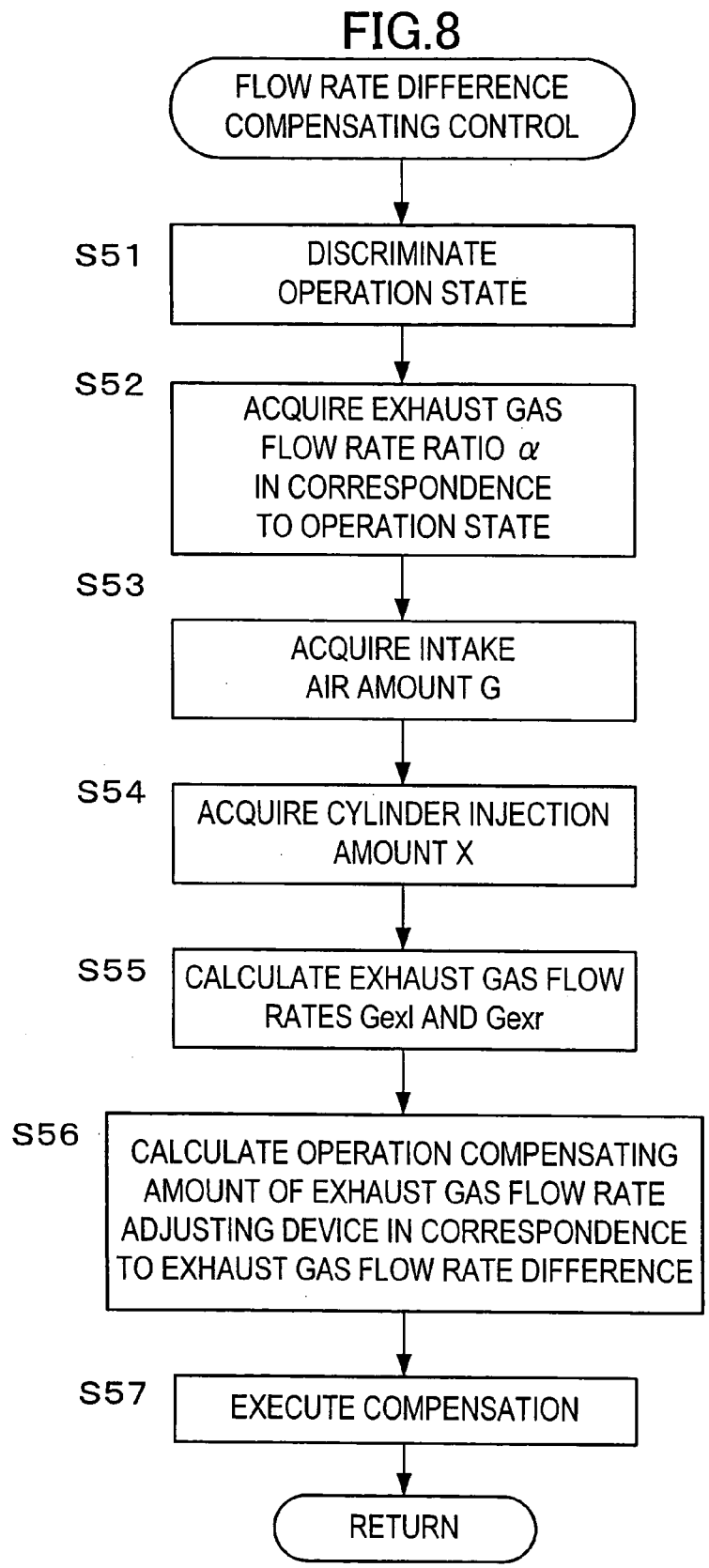
FIG. 8 is a flow chart showing a flow amount difference compensation control routine executed by the ECU in FIG. 4.

Further, the map stored in the ECU 12 is used for controlling the exhaust gas flow amount difference by the ECU 12. FIG.8 show a flow amount difference compensation control routine to be executed by the ECU 12 as one example of such control mentioned above. The ECU 12 functions as an exhaust gas flow amount calculating device by executing this routine.

In the flow amount difference compensation control routine in FIG. 8, the ECU 12 first determines an operation state for specifying the exhaust gas flow amount ratio α, that is, the engine rotation speed and the load in correspondence to the exhaust gas flow amount ratio α in the map in this case, in step S51. In next step S52, the ECU 12 acquires the exhaust gas flow amount ratio α in correspondence to the operation state on the basis of the map mentioned above. Subsequently, the ECU 12 acquires an intake air amount G by the air flow mater 9 in step S53, and acquires a cylinder injection amount (fuel injection amount to a cylinder) X from the command value to the fuel injection valve 20 in succeeding step S54.

In next step S55, the ECU 12 calculates the exhaust gas flow amounts Gexl and Gexr of the banks 2L and 2R by substituting the intake air amount G, the cylinder injection amount X and the exhaust gas flow amount ratio α obtained in the routine of this time for the above equations (4) and (5). The ECU 12 thereafter goes to step S56, and calculates the operation compensation amount of the exhaust gas flow amount adjusting device in correspondence to the difference of the exhaust gas flow amounts Gexl and Gexr. The exhaust gas flow amount adjusting device in this case is a device which can adjust the exhaust gas flow amount in at least any one of the banks 2L and 2R, for example, a variable nozzle type turbocharger 6 can be used as the exhaust gas flow amount adjusting device.

Namely, an exhaust back pressure is changed by adjusting the nozzle opening degree of the turbocharger 6, and an amount of an EGR gas returned from the EGR passages 13L and 13R and an amount of the exhaust gas left as an internal EGR gas within the cylinder 3 are changed in accordance with the change, so that the exhaust gas flow amount is changed. In this case, it is sufficient to determine the adjusting amount of the nozzle opening degree of the turbocharger 6 in at least any one of the banks 2L and 2R required for canceling the exhaust gas flow amount difference in step S56. A relation between the exhaust gas flow amount difference and the compensation amount of the nozzle opening degree may be experimentally determined and is stored in the ECU 12 in a map form or a function form, and it is sufficient to determine the compensation amount of the turbo nozzle corresponding to the exhaust gas flow amount difference with reference to the map or the like in step S56. After calculating the compensation amount in step S56, the ECU 12 goes to step S57, and compensates the operation amount of the exhaust gas flow amount adjusting device in accordance with the calculated compensation amount so as to cancel the exhaust gas flow amount difference of the left and right banks 2L and 2R. Thereafter, this time routine is finished.

According to the embodiment mentioned above, since all of the air flow meter 9, the fuel adding valves 17L and 17R and the air fuel ratio sensors 18L and 18R used for determining the exhaust gas flow amount ratio α and the exhaust gas flow amounts Gexl and Gexr are provided for the fuel injection amount control of the engine 1 and the reproduction control of the filters 16L and 16R, there is an advantage that no new sensors are necessarily provided for acquiring the exhaust gas flow amount difference. Further, since the flow amount adjustment of the exhaust gas is executed in such a manner that the calculated exhaust gas flow amount difference is cancelled, it is possible to equalize the exhaust gas flow amount in the filters 16L and 16R, and it is possible to inhibit the dispersion in the deteriorating speed owing to the accumulation of PM, the sulfur poisoning or the like in the filters 16L and 16R.

Figure 9:
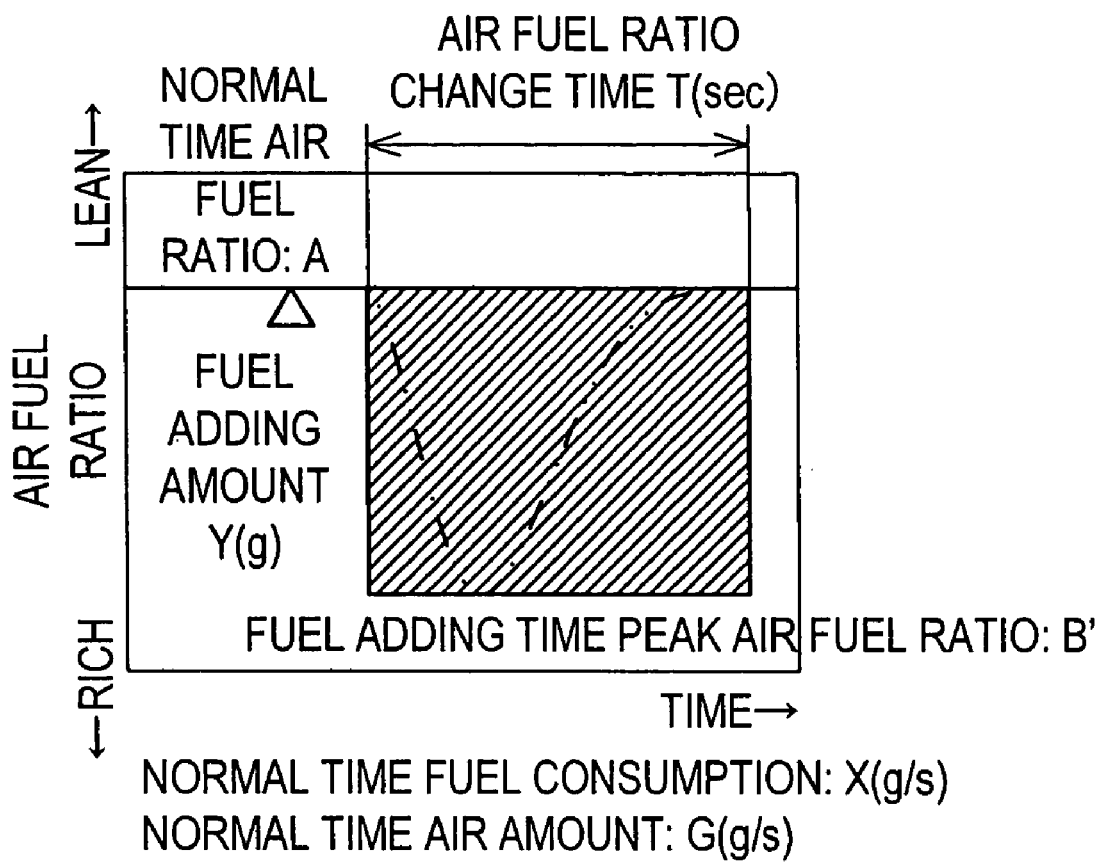
FIG. 9 is a diagram for explaining another example of an arithmetically operating method of a flow amount of exhaust gas flowing into a particulate filter.

As shown in FIG. 5D and the above equation (2), in the second embodiment mentioned above, the integration term is provided taking the change in the air fuel ratios Bl and Br after adding the fuel into consideration, however, as shown in FIG. 9 in accordance with a simple example, the exhaust gas flow amount difference may be determined on the assumption that the air fuel ratio B after adding the fuel is fixed at a peak value B' during the air fuel ratio changing time T. In this case, the exhaust gas flow amounts Gexr and Gexl may be determined by utilizing the equation (1) in place of the above equation (2).

In steps S56 and S57 in FIG. 8, the turbocharger 6 is utilized as the exhaust gas flow amount adjusting device. In the compensation of the exhaust gas flow amount difference utilizing this device, it is possible to intend to cancel the exhaust gas flow amount difference while inhibiting the change in the supercharging pressure to the intake manifold 8, by compensating the nozzle opening degree of the turbocharger 6 corresponding to the bank 2R or 2L in the side having a smaller exhaust gas flow amount to the open side so as to increase the flow amount of the exhaust gas flowing into the filter 16R or 16L while compensating the nozzle opening degree of the turbocharger 6 corresponding to the bank 2L or 2R in the side having a larger exhaust gas flow amount to the close side so as to reduce the flow amount of the exhaust gas flowing into the filter 16L or 16R. In this case, there is an advantage of inhibiting influence on the combustion of the engine 1.

In the second embodiment, besides the turbocharger 6, for example, the EGR valves 15L and 15R may be utilized as the exhaust gas flow amount adjusting device. For example, by compensating the opening degree of the EGR valve 15L or 15R in the bank 2L or 2R in the side having a larger exhaust gas flow amount to the open side in the EGR valves 15L and 15R, and compensating the opening degree of the EGR valve 15R or 15L in the bank 2R or 2L in the side having a smaller exhaust gas flow amount to the close side, it is possible to reduce the flow amount difference of the exhaust gas flowing into the filters 16L and 16R while inhibiting the change in the EGR gas amount returned to the intake manifold 8. In this case, the regulating range of the exhaust gas flow amount difference can be limited by the EGR amount, however, the influence on the back pressure and the intake air pressure in the exhaust passages 10L and 10R are smaller in comparison with the case of adjusting the nozzle opening degree of the turbocharger 6, so that the influence on the combustion state of the engine 1 becomes smaller.

As the exhaust gas flow amount adjusting device, it is possible to utilize a variable valve mechanism which changes an operation characteristic of the intake valve or the exhaust valve of the engine 1. The exhaust gas flow amount difference can be reduced, for example, by making an opening time of the exhaust vale in the bank 2R or 2L in the side having the smaller exhaust gas flow amount long while making the opening time of the exhaust valve in the bank 2L or 2R in the side having the larger exhaust gas flow amount short. The exhaust gas flow amount difference can be reduced by reducing a lift amount in the side having the larger exhaust gas flow amount and increasing the lift amount in the side having the smaller exhaust gas flow amount in place of the adjustment of the opening time or in addition thereto. Further, the exhaust gas flow amount difference can be reduced also by changing an overlap amount of the opening times of the intake valve and the exhaust valve so as to increase or reduce the internal EGR amount.

The exhaust gas flow amounts Gexl and Gexr calculated in the second embodiment can be also utilized with respect to the following intended uses in addition to the control for canceling the exhaust gas flow amount difference.

(1) Reduction of NOx of Each Bank

In the engine 1, the filters 16L and 16R also function as an NOx occlusion-reduction type catalyst, and NOx absorption amounts NOx_L and NOx_R of the banks are expressed by the following equations on the assumption that a concentration of NOx contained in the exhaust gas is set to NOx (%) and an operating time of the engine 1 is set to T (s).

$$NOx\_L = Gexl \cdot NOx\text{(\%)} \cdot T(s)$$

$$NOx\_R = Gexr \cdot NOx\text{(\%)} \cdot T(s)$$

In this case, NOx (%) can be experimentally determined in correspondence to the operating state of the engine 1. The exhaust gas flow amount Gexl and Gexr can be determined in accordance with the procedures mentioned above. In the case where any one of the NOx absorption amounts determined in the manner mentioned above reaches a predetermined limit value, the fuel is added to the filter 16L or 16R in the side reaching the limit value from the fuel adding valve 17L or 17R so as to reduce the NOx. It is possible to apply the NOx reducing process to each of the filters 16L and 16R at an optimum timing in view of specific fuel consumption and an exhaust purifying performance, by independently calculating the NOx absorption amount of each bank.

(2) PM Reproducing Control of Each Bank

A clogging degree of each of the filters 16L and 16R due to the PM, in other words, an accumulation amount (or a collection amount) of the PM is determined by detecting differential pressures ΔPl and ΔPr between the front and rear of the filters 16L and 16R by a differential pressure sensor, and setting values ΔPl/Gexl and ΔPr/Gexr obtained by dividing the detected values by the exhaust gas flow amounts Gexl and Gexr flowing into each of the filters 16L and 16R to decision values. In this case, the exhaust gas flow amounts Gexl and Gexr can be determined in accordance with the procedures mentioned above. Further, in the case where any one of the decision values of the banks reaches the predetermined limit value, the PM reproduction process, that is, a process required for oxidizing the particulate matters is executed to the filter 16L or 16R in the side reaching the limit value. In this case, the PM reproduction process can be applied to each of the banks at an optimum timing by independently determining the clogging degree of each bank.

(3) Sulfur Reproducing Control of Each Bank

Sulfur poisoning amounts Sl and Sr (in this case, unit is gram) of the filters 16L and 16R are determined in accordance with the following equations by utilizing the exhaust gas flow amounts Gexl and Gexr determined in accordance with the procedures mentioned above and the air fuel ratio sensors 18L and 18R.

$$Sl = ((Gexl \cdot T/Al) + Yl) \cdot Fs$$

$$Sr = ((Gexr \cdot T/Ar) + Yr) \cdot Fs$$

In this case, reference symbol Fs denotes a percentage content of a sulfur component in the fuel, which can previously be given in accordance with the fuel. As mentioned above, reference symbol T denotes the operating time, reference symbols Al and Ar denote an air fuel ratio, and reference symbols Yl and Yr denote a fuel adding amount. The exhaust gas flow amounts Gexl and Gexr can be determined in accordance with the procedures mentioned above.

In the case where any one of the obtained sulfur poisoning amounts Sl and Sr reaches the predetermined limit value, a process required for reproducing the sulfur poisoning is applied to the filter 16L or 16R in the side reaching the limit value. Accordingly, it is possible to apply the reproducing process of the sulfur poisoning to each of the filters 16L and 16R at an optimum timing in view of the specific fuel consumption and the exhaust purifying performance.

(4) Estimation of Catalyst Bed Temperature of Each Bank

It is possible to estimate a temperature (a catalyst bed temperature) of the filters 16L and 16R by detecting the exhaust gas temperature in a downstream side of the filters 16L and 16R by the temperature sensor and utilizing the temperature and the exhaust gas flow amount Gexl and Gexr determined in accordance with the procedures mentioned above.

(5) Uniformization of Catalyst Bed Temperature of Each Bank

The change in the supercharging pressure can be inhibited by calculating the temperature difference in each of the filters 16L and 16R on the basis of the bed temperature determined in accordance with the item (4) mentioned above, compensating the nozzle opening degree of the turbocharger 6 in the side having a lower temperature to the open side so as to conduct more exhaust gas heat to the lower temperature side filter 16L or 16R, and compensating the nozzle opening degree of the opposite side turbocharger 6 to the close side. In the case of executing the control mentioned above in a cold condition of the engine 1, it is possible to uniformly increase the bed temperature of the filters 16L and 16R in the left and right banks 2L and 2R to a catalyst activation temperature so as to improve the exhaust purifying performance in the cold condition.

The present invention can be carried out according to various aspects, without being limited to the first embodiment and the second embodiment mentioned above. For example, the internal combustion engine to which the present invention is not limited to the V-type engine, but can be a horizontal opposed type engine, an in-line type engine and the like, as far as a plurality of cylinder groups are respectively connected to different exhaust passages regardless of a layout thereof. Further, the structure may be made such that at least one cylinder is included in one cylinder group.

In each of the embodiments, the intake manifold 8 functions as the common intake passage, however, the present invention can be advantageously applied to a structure as far as a part of the intake passage is made common between the cylinder groups, and the intake air amount (the fresh air amount) is detected by the common portion, whereby the intake air amount (the fresh air amount) of each cylinder group cannot be determined, even in the case where the intake manifold is independently provided for each of the cylinder groups.

The supercharger usable as the exhaust gas flow amount adjusting device is not limited to the variable nozzle type turbocharger, and even a motor assist type turbocharger in which a rotation of a compressor is changed by an electric motor can be utilized as the exhaust gas flow amount adjusting device, by changing the operation of the electric motor and adjusting the relation between the exhaust gas flow amount and the recovered energy amount.

As described above, according to the exhaust control apparatus of the present invention, it is possible to inhibit the dispersion in the exhaust gas flow amount between the exhaust passages by estimating the flow amount difference in the exhaust gas between the exhaust passages and controlling the exhaust gas flow amount adjusting device in such a manner that the difference is reduced, and it is possible to intend to solve the disadvantage such that the dispersion in the deteriorating speed of the exhaust purifying device in each of the exhaust passages which may be generated in accordance with the dispersion. Further, according to the exhaust gas flow amount estimating method of the present invention, it is possible to estimate the flow amount difference of the exhaust gas in the exhaust passage by previously acquiring the flow amount ratio information, without changing the operation state of the internal combustion engine at a time when the necessity of estimating the flow amount of the exhaust gas in each exhaust passage is generated.

What is claimed is:

1. An exhaust control apparatus applied to an internal combustion engine in which intake sides of a plurality of cylinder groups are connected to a common intake passage and exhaust sides thereof are connected to different exhaust passages, comprising:
   an exhaust gas flow amount adjusting device for causing a flow amount of exhaust gas, which is discharged through each of the exhaust passages of the cylinder groups, to be changed;
   an exhaust gas flow amount difference estimating device for estimating a difference in an exhaust gas flow amount between the exhaust passages of the cylinder groups; and
   an exhaust gas flow amount control device for controlling the exhaust gas flow amount adjusting device so as to reduce the estimated difference in the exhaust gas flow amount.

2. The exhaust gas control device according to claim 1, wherein the internal combustion engine comprises an intake air amount detecting device for detecting an amount of fresh air to be sucked to the common intake passage,
   an exhaust gas flow amount adjusting valve for varying a cross-sectional area through which the exhaust gas is passed is provided as the exhaust gas flow amount adjusting device, and
   the exhaust gas flow amount difference estimating device executes, in turn, an operation of detecting the fresh air amount by the intake air amount detecting device in a state that one exhaust gas flow amount adjusting valve corresponding to one of the cylinder groups is opened at a predetermined degree while the other exhaust gas flow amount adjusting valve corresponding to the other cylinder group is closed, with replacing the exhaust gas flow amount adjusting valve to be opened at the predetermined degree, and estimates the difference in the exhaust gas flow amount by comparing a detection result of the fresh air amount in each detection time.

3. The exhaust gas control apparatus according to claim 1, wherein the internal combustion engine comprises an exhaust purifying device arranged in each of the exhaust passages of the cylinder groups, a fuel supplying device for supplying fuel to the exhaust purifying device, and an air fuel ratio detecting device for detecting an air fuel ratio in a downstream side of a fuel supply position by the fuel supplying device, and
   the exhaust gas flow amount difference estimating device supplies a predetermined amount of the fuel from the fuel supplying device to the exhaust purifying device in each of the exhaust passages, detects, by the air fuel ratio detecting device, a change in the air fuel ratio before and after supplying the fuel, and estimates the exhaust gas flow amount in each of the exhaust passages on the basis of the fuel supply amount and detection results of the air fuel ratio.

4. The exhaust control apparatus according to claim 3, wherein the internal combustion engine is provided with two of cylinder groups as said plurality of cylinder groups, and an intake air amount detecting device for detecting an amount of fresh air to be sucked to the common intake passage, and
   the exhaust gas flow amount difference estimating device comprises:
   a flow amount ratio information acquiring device for executing a process of determining an exhaust gas flow amount ratio between the exhaust passages on the basis of the estimated exhaust gas flow amount in each of the exhaust passages in connection with a plurality of sampling points set at different positions in an operation area of the internal combustion engine, and acquiring flow amount ratio information describing a correlation between the operation state of the internal combustion engine and the flow amount ratio on the basis of the measured result at each of the sampling points, and
   an exhaust gas flow amount calculating device for calculating the amount of the exhaust gas discharged from each of the exhaust passages, on the basis of the flow amount ratio conducted from the flow amount ratio information in response to a given operation state, the fresh air amount detected by the intake air amount detecting device, and the amount of the fuel supplied to the cylinder groups.

5. The exhaust control apparatus according to claim 1, wherein the internal combustion engine is provided with at least one of a turbocharger which can adjust a recovery percentage of exhaust gas energy from each of the exhaust passages of the cylinder groups, an EGR valve which adjusts an amount of the exhaust gas to be returned to the common intake passage from each of the exhaust passages of the cylinder groups, and a variable valve mechanism for changing an operation characteristics of intake valves or exhaust valves with respect to the cylinder groups, as the exhaust gas flow amount adjusting device.

6. The exhaust control apparatus according to claim 1, wherein the internal combustion engine comprises an exhaust purifying device arranged in each of the exhaust passages of the cylinder groups, and a reproduction control device for controlling a reproduction operation of the exhaust purifying device in each exhaust passages in such a manner that the reproduction operation for each exhaust purifying device is executed at the same time.

7. An exhaust gas flow amount estimating method for estimating a flow amount of exhaust gas in each of exhaust passages, which is applied to an internal combustion engine comprising two cylinder groups which are connected to a common intake passage in each of intake sides and are connected to different exhaust passages in exhaust sides, an intake air amount detecting device for detecting an amount of fresh air sucked into the common intake passage, an exhaust purifying device which is provided in each of the exhaust passages of the cylinder groups, a fuel supplying device for supplying fuel to the exhaust purifying device, and an air fuel ratio detecting device for detecting an air fuel ratio in a downstream side of a fuel supply position by the fuel supplying device, comprising the steps of:
   executing a measuring process including a procedure of supplying a predetermined amount of fuel to the exhaust purifying device in each of the exhaust passages from the fuel supplying device, detecting a change in the air fuel ratio before and after supplying the fuel by the air fuel ratio detecting device, and estimating a flow amount of the exhaust gas in each of the exhaust passages on the basis of a supply amount of the fuel and a detected result of the air fuel ratio, and a procedure of determining a flow amount ratio of the exhaust gas between the exhaust passages on the basis of the estimated flow amount of the exhaust gas in each of the exhaust passages, said measuring process being executed with respect to a plurality of sampling points set at different positions in an operation area of the internal combustion engine;

acquiring flow amount ratio information describing a correlation between the operation state of the internal combustion engine and the flow amount ratio on the basis of the measured result at each of the sampling points; and calculating an amount of the exhaust gas discharged from each of the exhaust passages on the basis of the flow amount ratio conducted to a given operation state from the flow amount ratio information, the fresh air amount detected by the intake air amount detecting device, and the fuel amount supplied to the cylinder groups.

8. The exhaust gas flow amount estimating method according to claim 7, wherein the internal combustion engine comprises a reproduction control device for controlling a reproduction operation of the exhaust purifying device in each exhaust passages in such a manner that the reproduction operation for each exhaust purifying device is executed at the same time.

* * * * *